(12) United States Patent
Park et al.

(10) Patent No.: US 8,897,106 B2
(45) Date of Patent: Nov. 25, 2014

(54) OBJECTIVE LENS FOR OPTICAL PICKUP AND OPTICAL PICKUP APPARATUS HAVING THE SAME

(75) Inventors: Seong-su Park, Hwaseong-si (KR); Soo-han Park, Yongin-si (KR); Woo-chang Chun, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/599,473

(22) Filed: Aug. 30, 2012

(65) Prior Publication Data

US 2013/0051209 A1 Feb. 28, 2013

(30) Foreign Application Priority Data

Aug. 30, 2011 (KR) ........................ 10-2011-0087158

(51) Int. Cl.
*G11B 7/135* (2012.01)
*G11B 7/1374* (2012.01)
(Continued)

(52) U.S. Cl.
CPC ............ *G11B 7/1381* (2013.01); *G11B 7/1374* (2013.01); *G02B 5/1814* (2013.01); *G02B*
(Continued)

(58) Field of Classification Search
CPC .... G11B 7/135; G11B 7/1353; G11B 7/1365; G11B 7/1367; G11B 7/1372; G11B 7/1374; G11B 7/1376; G11B 7/1378; G11B 7/1381; G11B 7/139; G11B 7/1392; G11B 7/13922; G11B 7/1398; G11B 2007/0006; G11B 2007/135; G11B 2007/1372; G11B 2007/13722; G11B 3/00; G11B 3/02; G11B 3/04; G11B 3/08; G11B 3/10; G11B 3/14; G11B 5/003; G11B 5/02; G11B 5/021; G11B 5/0215; G11B 5/0221; G11B 5/0252; G11B 5/18; G11B 5/1814; G11B 5/1861; G11B 5/1866; G11B 5/1876; G11B 5/189; G11B 13/00; G11B 13/002; G11B 13/18; G11B 27/0037; G11B 2005/18
See application file for complete search history.

(56) References Cited

U.S. PATENT DOCUMENTS

| 5,281,797 A | * | 1/1994 | Tatsuno et al. ............. 250/201.5 |
| 5,665,957 A | | 9/1997 | Lee et al. |

(Continued)

FOREIGN PATENT DOCUMENTS

| EP | 1195753 B1 | 4/2002 |
| EP | 0806039 B1 | 5/2002 |

(Continued)

OTHER PUBLICATIONS

International Search Report, dated Feb. 21, 2013, issued by the International Patent Office in counterpart International Application No. PCT/KR2012/006928.

(Continued)

*Primary Examiner* — Wayne Young
*Assistant Examiner* — Brian Butcher
(74) *Attorney, Agent, or Firm* — Sughrue Mion, PLLC

(57) ABSTRACT

An objective lens for optical pickup and an optical pickup apparatus having the same are provided. The objective lens for optical pickup includes a light source side lens surface and a disc side lens surface. The light source side lens surface and the disc side lens surface each include an effective region disposed at a central region of the objective lens and a non-effective region disposed outside the effective region. An optical path changing element, disposed in the non-effective region of at least one of the light source side lens surface and the disc side lens surface, changes a path of light incident thereon.

20 Claims, 12 Drawing Sheets

(51) Int. Cl.
*G02B 5/18* (2006.01)
*G02B 13/00* (2006.01)
*G11B 7/1381* (2012.01)
*G11B 7/1353* (2012.01)
*G11B 7/00* (2006.01)

(52) U.S. Cl.
CPC .. *13/0055* (2013.01); *G02B 13/005* (2013.01); *G11B 2007/0006* (2013.01); *G11B 7/1353* (2013.01)
USPC ............ 369/44.24; 369/94; 369/112.08; 369/112.13; 369/112.23; 369/112.25; 369/286; 359/721

(56) References Cited

U.S. PATENT DOCUMENTS

| | | | |
|---|---|---|---|
| 5,822,135 A | 10/1998 | Lee et al. | |
| 5,907,530 A | 5/1999 | Cho et al. | |
| 5,987,924 A | 11/1999 | Lee et al. | |
| 6,043,912 A * | 3/2000 | Yoo et al. | 359/19 |
| 2005/0078384 A1 | 4/2005 | Park | |
| 2008/0074757 A1 | 3/2008 | Yoo et al. | |

FOREIGN PATENT DOCUMENTS

| | | |
|---|---|---|
| KR | 100234257 B1 | 3/1997 |
| WO | 9708691 A1 | 3/1997 |

OTHER PUBLICATIONS

Written Opinion, dated Feb. 12, 2013, issued by the International Patent Office in counterpart International Application No. PCT/KR2012/006928.

\* cited by examiner

OBJECTIVE LENS FOR OPTICAL PICKUP AND OPTICAL PICKUP APPARATUS HAVING THE SAME

CROSS-REFERENCE TO RELATED APPLICATION

This application claims priority from Korean Patent Application No. 10-2011-87158, filed Aug. 30, 2011, in the Korean Intellectual Property Office, the disclosure of which is incorporated herein by reference in its entirety.

BACKGROUND

1. Field

Apparatuses and methods consistent with exemplary embodiments relate to an objective lens for optical pickup and an optical pickup apparatus having the same, and to an objective lens for optical pickup in which an optical path changing element is provided in a non-effective region outside an effective region, and an optical pickup apparatus having the same.

2. Description of the Related Art

An optical pickup apparatus, as an apparatus for recording information on a disc or reproducing the information from the disc by using light, includes an objective lens for focusing the light irradiated from a light source on the disc.

There are various types of discs, such as blue-ray discs (BDs), digital versatile discs (DVDs), and compact discs (CDs), and according to the type of disc being used, an optical pickup apparatus is provided with an appropriate objective lens. An objective lens, which is compatible with BDs, DVDs, and CDs, is also in use. Hereinafter, such an objective lens is referred as a "compatible objective lens".

The light irradiated from a light source is incident on a light source side lens surface of the objective lens. The incident light is not incident on an entirety of the light source side lens surface, but only on an inner region having a fixed diameter. The inner region is usually called an "effective region" or an "effective diameter". For the sake of explanation, hereinafter, a region disposed outside the effective region on the lens surface is referred as a "non-effective region".

For instance, by providing a barrel supporting the objective lens, the barrel having an aperture in a size corresponding to the effective region of the objective lens, the light irradiated from the light source can be guided onto only the effective region. However, due to factors, such as design tolerances of the objective lens and the barrel, deformations due to use of the objective lens and the barrel, assembling tolerances between the objective lens and the barrel and the like, the light irradiated from the light source may be partially transmitted onto the non-effective region (outer region) of the light source side lens surface.

In the non-effective region disposed at an edge of the objective lens, the lens surface may have a relatively large slope, as compared to a slope within the effective region, which is disposed at a center of the objective lens.

Accordingly, if the light is incident onto the non-effective region, light transmitted by the objective lens may become deteriorated or degraded due to aberrations. Such a deterioration or degradation may be more intensified in an objective lens for use with a BD or in a compatible objective lens having a relatively large numerical aperture (NA).

SUMMARY

One or more exemplary embodiments may overcome the above disadvantages and other disadvantages not described above. Exemplary embodiments are not required to overcome the disadvantages described above, and one or more exemplary embodiments may not overcome any of the problems described above.

One or more exemplary embodiments provide an objective lens for optical pickup, which can reduce or prevent a degradation or deterioration of light incident onto a non-effective region of a lens surface, due to aberration, and an optical pickup apparatus having the same.

According to an aspect of an exemplary embodiment, an objective lens for optical pickup includes a light source side lens surface and a disc side lens surface, wherein the light source side lens surface and the disc side lens surface each comprise an effective region disposed at a central region of the objective lens, and a non-effective region disposed outside the effective region. An optical path changing element, disposed in the non-effective region of at least one of the light source side surface and the disc side surface, changes a path of light incident thereon.

The optical path changing element may be a diffraction element which changes a focal point of light incident on the non-effective region.

The diffraction element may diffract light incident thereon to a focal point further away from the objective lens than a focal point of light incident on the effective region.

The diffraction element may diffract light incident thereon to a focal point closer to the objective lens than a focal point of light incident on the effective region.

The diffraction element may diffract light incident thereon to a focal point off an optical axis of the objective lens.

The optical path changing element may be a scattering element which scatters light incident thereon.

The optical path changing element may be a penetration blocking member which blocks light incident thereon.

The penetration blocking member may be made of a total reflection material or a light absorbing material.

The optical path changing element may be disposed on the light source side lens surface.

The objective lens may be configured to be compatible with a blue-ray disc.

The objective lens may be a compatible objective lens configured to be compatible with a blue-ray disc, a digital versatile disc, and a compact disc.

According to an aspect of another exemplary embodiment, an optical pickup apparatus includes the objective lens for optical pickup as described above.

The distance between a focal point of light incident on the non-effective region and the focal point of light incident on the effective region is dx1, a distance from a surface of the disc to a deepest recording layer of the disc is Dmax, a distance from the surface of the disc to a most shallow recording layer of the disc is Dmin, and the distance $d_{x1}$ may be within a range represented by the following formula:

$$2 \times D\text{max} - D\text{min} + 10\ \mu m \le dx1 \le 600\ \mu m.$$

The distance between the focusing point of the light incident onto the non-effective region and the focusing point of the light incident onto the effective region is dx2, a distance from a surface of the disc to a deepest recording layer of the disc is Dmax, and the distance dx2 is within a range represented by the following formula:

$$D\text{max} + 10\ \mu m \le dx2 \le 400\ \mu m.$$

The optical pickup apparatus may further include a collimating lens, disposed between the light source and the objective lens, which collimates light incident thereon from the light source, a light detector which detects light reflected from the disc, and a sensor lens disposed on a light-incident side of the light detector, which focuses the light reflected from the disc onto the light detector. The distance between a focal point of the light incident on the non-effective region and the optical axis of the objective lens is dy, a focal distance of the effective region of the objective lens is f1, a focal distance of a combination lens comprising the collimating lens and the sensor lens is f2, and the distance dy is within a range represented by the following formula:

$$0.45 \times (f2/f1) \leq d_y \leq f2/f1.$$

BRIEF DESCRIPTION OF THE DRAWINGS

The above and/or other exemplary aspects will become more apparent by describing certain exemplary embodiments with reference to the accompanying drawings, in which.

DETAILED DESCRIPTION

Exemplary embodiments are described in greater detail below with reference to the accompanying drawings.

Figure 1:
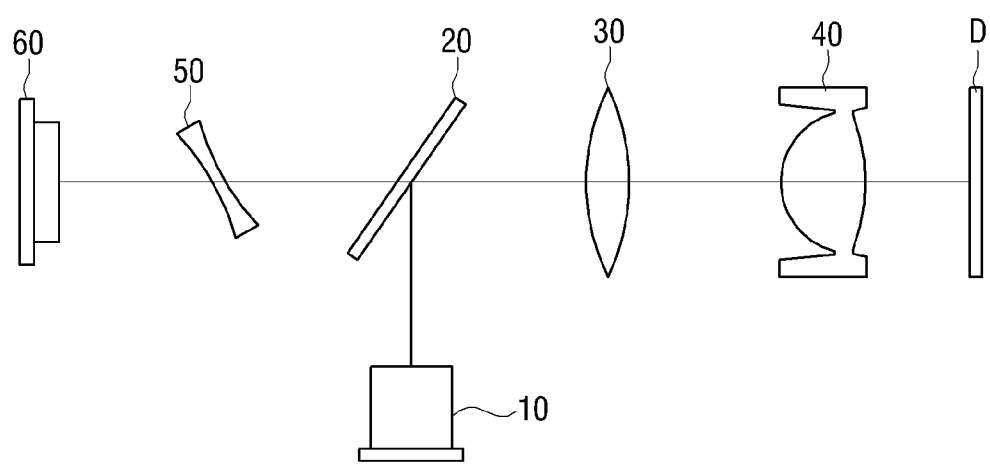
FIG. 1 is a schematic view of an optical pickup apparatus according to an exemplary embodiment.

FIG. 1 is a schematic view of an optical pickup apparatus according to an exemplary embodiment.

The optical pickup apparatus 1 includes a light source 10, a beam splitter 20, a collimating lens 30, an objective lens 40, a sensor lens 50 and a light detector 60.

The light source 10 generates light which is used in recording information on a disc D or reproducing the information recorded on the disc D. The light source 10 includes a laser diode for generating the light. However, the light source 10 is not limited thereto, but may include one or more other light generating devices.

The beam splitter 20 reflects at least a portion (for example, 50%) of the light irradiated from the light source 10 toward the objective lens 40, and transmits at least a portion (for example, 50%) of the light reflected from the disc D toward the light detector 60.

The collimating lens 30 is disposed between the beam splitter 20 and the objective lens 40 and converts the light irradiated from the light source 10 into parallel light.

The objective lens 40 focuses the light irradiated from the light source 10 onto the disc D.

The sensor lens 50, as a concave lens, is disposed between the beam splitter 20 and the light detector 60. With the sensor lens 50, the light reflected from the disc D can be focused on the light detector 60.

The light detector 60 detects the light reflected from the disc D and converts it into an electric signal from which the information recorded on the disc D can be reproduced and from which a control signal for driving the optical pickup apparatus 1 can be obtained.

The disc D to which the optical pickup apparatus 1 as described above is applied is any one of a BD, a DVD and a CD.

If the disc D is a BD, a laser diode, which generates a laser beam having a wavelength of approximately 405 nm, and an objective lens for BD, having a numerical aperture (NA) of approximately 0.85, are employed as the light source 10 and the objective lens 40, respectively. If the disc D is a DVD, a laser diode, which generates a laser beam having a wavelength of approximately 660 nm, and an objective lens, for DVD having a numerical aperture (NA) of approximately 0.6, are employed as the light source 10 and the objective lens 40, respectively. If the disc D is a CD, a laser diode, which generates a laser beam having a wavelength of approximately 780 nm, and an objective lens for CD, having a numerical aperture (NA) of approximately 0.45, are employed as the light source 10 and the objective lens 40, respectively.

The objective lens 40 may also be a compatible objective lens, which is compatible with BDs, DVDs the CDs. In this case, a compatible light source, which can selectively generate a laser beam having wavelength of approximately 405 nm, a laser beam having a wavelength of approximately 660 nm and a laser beam having the wavelength of approximately 780 nm, is employed as the light source 10.

Hereinafter, objective lenses for optical pickup according to various exemplary embodiments capable of being employed as the objective lens 40 provided in the optical pickup apparatus 1 as described above will be explained in detail with reference to FIGS. 2 to 12.

Figure 2:
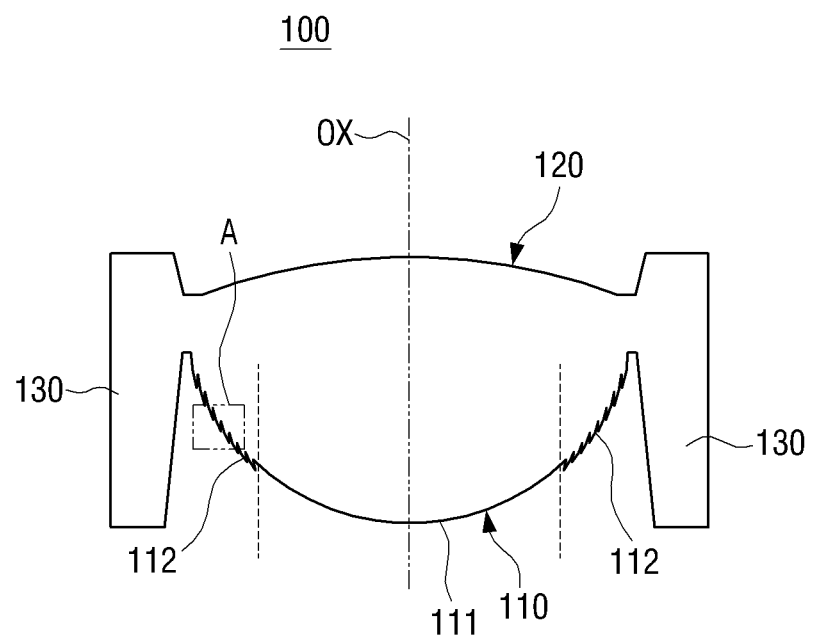
FIG. 2 is a side elevation of an objective lens for optical pickup according to a first exemplary embodiment.
Figure 3:
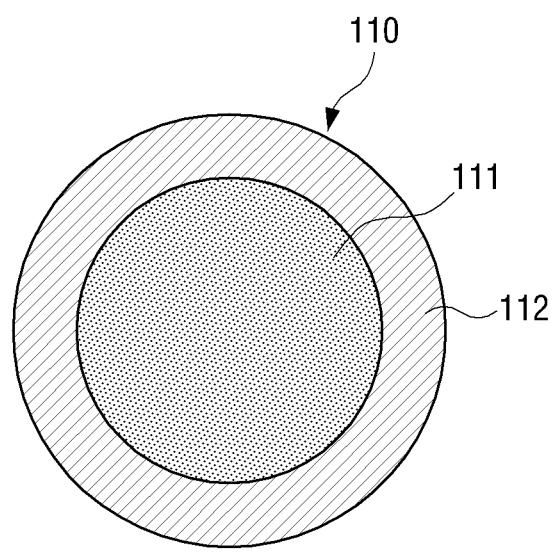
FIG. 3 is a top plan view of a light source side lens surface of the objective lens for optical pickup shown in FIG. 2.
Figure 4:
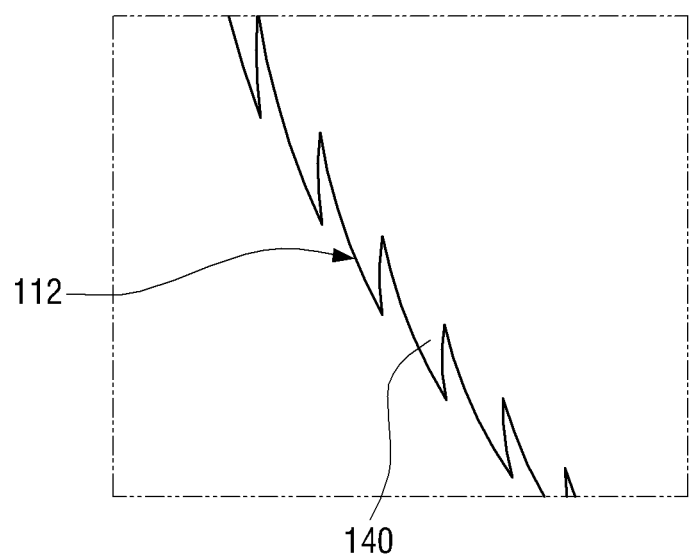
FIG. 4 is a view magnifying an region A of FIG. 2.

FIG. 2 is a side elevation of an objective lens 100 for optical pickup according to a first exemplary embodiment, FIG. 3 is a top plan view of a light source side lens surface 110 of the objective lens 100 for optical pickup shown in FIG. 2, and FIG. 4 is a view magnifying an region A of FIG. 2.

Referring to FIGS. 2 to 4, the objective lens 100 has a light source side lens surface 110 and a disc side lens surface 120. The light source side lens surface 110 corresponds to an outer surface, which receives light irradiated from the light source 10, and the disc side lens surface 120 corresponds to an inner surface, which is disposed to face the disc D. A fixing part 130 is provided at an outer edge of the objective lens 100 by which the objective lens 100 is fixed to a barrel (not shown).

As shown in FIGS. 2 and 3, the light source side lens surface 110 includes an effective region 111 disposed at a central region of the objective lens 100 and a non-effective region 112 disposed toward a peripheral region of the objective lens 100.

In the case of an ideal objective lens, no matter where on the light source side lens surface 110 light is irradiated onto, the light is focused to a certain focal point. In the case of a real objective lens, however, it is difficult for all of the light incident onto the lens surface to be focused to the same focal point. Accordingly, a real objective lens generates a certain amount of aberration.

Particularly, as shown in FIG. 2, the farther from an optical axis OX, the larger an inclined angle Θ of the lens surface 110 is. Thus, the farther from the optical axis OX, the greater the aberration caused by the curvature of the lens. Also, if the objective lens 100 is a objective lens for BD or a compatible objective lens for BD/DVD/CD, there is a greater probability of degradation due to aberration because the numerical aperture NA of the objective lens 100 is relatively large.

Accordingly, during optical pickup, only an inner region of the light source side lens surface 110 of the objective lens 100, which is within a certain distance from the optical axis OX, should be used. The effective region 111 as mentioned above, which represents such an inner region, can be defined as a portion of the lens surface 110 which is optimized (that is, effective) for forming a light spot. If the objective lens 100 is an objective lens for BD or a compatible objective lens for BD/DVD/CD, the light source side lens surface 110 of the objective lens 100 has effective regions set for use with a BD, a DVD and a CD, respectively, and in this case, an effective region for use with a BD, which is the largest region among them, corresponds to the effective region 111. On the other hand, the non-effective region 112 as mentioned above, is a portion of the lens surface 110 disposed outside the effective region 111, and can be defined as a region unsuitable for forming the light spot.

Since the non-effective region 112 of the light source side lens surface 110 is more likely to cause degradation, the optical pickup apparatus 1 is designed so that the light is incident only onto the effective region 111 of the light source side lens surface 110. For instance, the light irradiated from the light source 10 can be guided to the effective region 111 of the light source side lens surface 110 by the aperture formed in the barrel (not shown).

However, due to factors, such as design tolerances of the objective lens 100 and the barrel, deformations caused by use of the objective lens 100 and the barrel, assembly tolerances between the objective lens 100 and the barrel and the like, the light irradiated from the light source 10 may be partially transmitted onto the non-effective region 112 of the light source side lens surface 110. In this way, if even a portion of the light irradiated from the light source 10 is transmitted onto the non-effective region 112 of the light source side lens surface 110, the objective lens 100 will deteriorate or degrade the transmitted light due to aberration.

According to one or more exemplary embodiments, the non-effective region 112 of the light source side lens surface 110 is provided with a diffraction element 140 (see FIG. 4) as a light path changing element. A shape of the diffraction element 140 shown in FIG. 4 is exemplary, and in alternative other embodiments, diffraction elements with other shapes may be employed.

Figure 5:
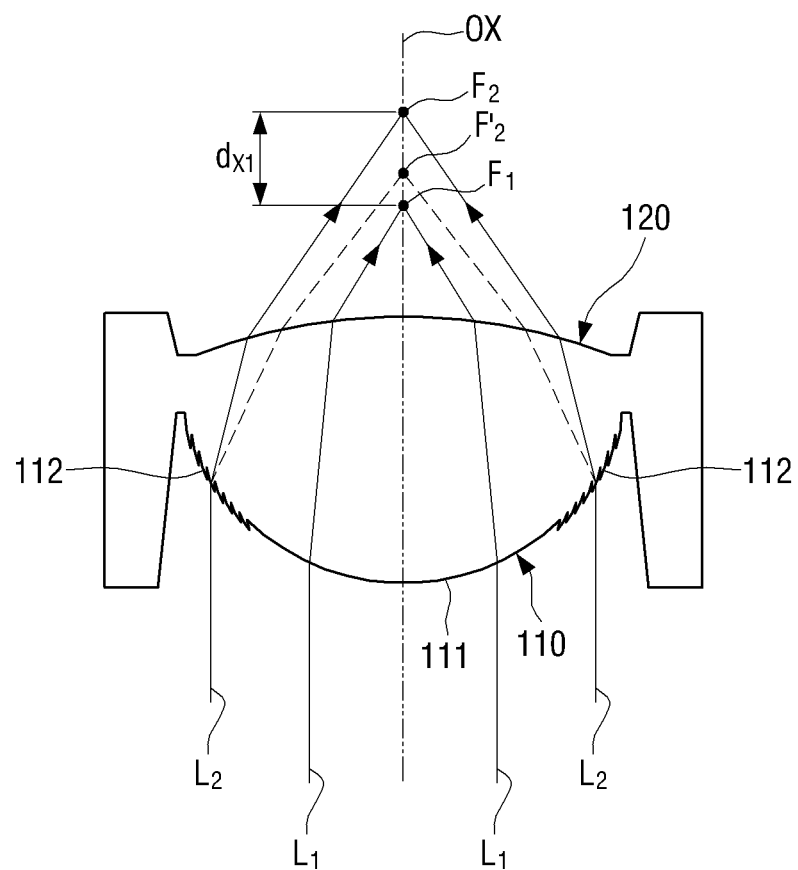
FIGS. 5 and 6 are views showing a path of light incident into the objective lens for optical pickup shown in FIG. 2.
Figure 6:
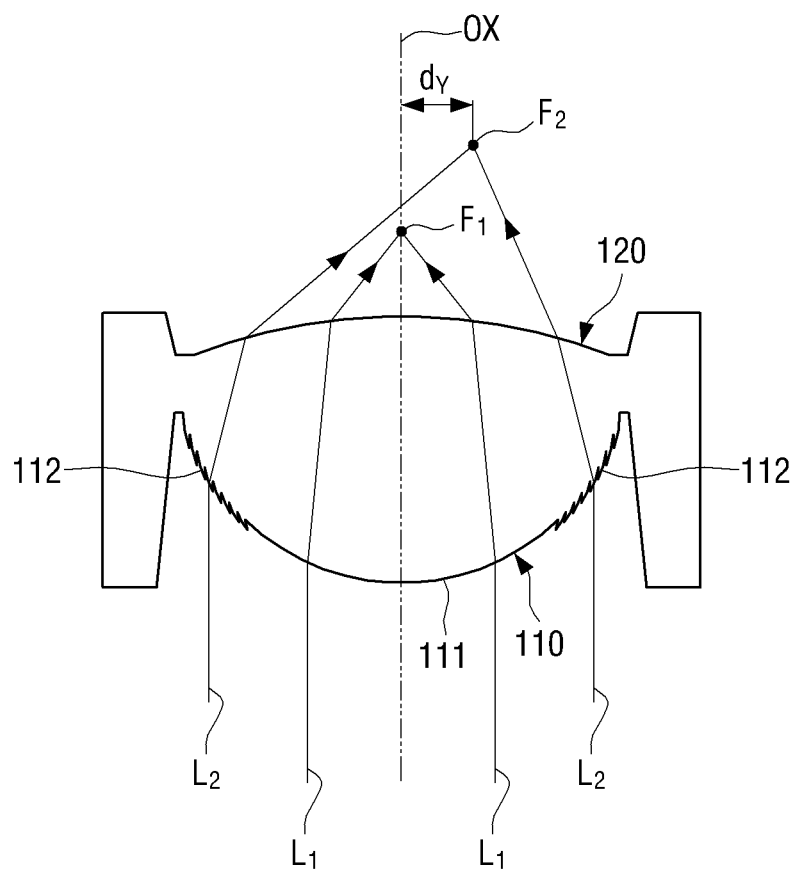

An operation of the diffraction element 140 provided in the non-effective region 112 of the light source side lens surface 110 will be explained with reference to FIGS. 5 and 6. FIGS. 5 and 6 are views showing a path of light incident onto the objective lens for optical pickup shown in FIG. 2.

Referring to FIGS. 5 and 6, light L1, which is incident onto the effective region 111 of the light source side lens surface 110, is focused on a first point F1, and light L2, which is incident onto the non-effective region 112 of the light source side lens surface 110, is focused on a second point F2. However, F2, shown in FIG. 5, is a point on which the light incident onto the non-effective region 112 is focused when the diffraction element 140 (see FIG. 4) is not provided in the effective region 111.

In this way, the diffraction element 140 diffracts the light L2 incident onto the non-effective region 112 to change a path thereof, and the point F2, on which the light L2 is focused, is moved away, along the optical axis OX (as shown in FIG. 5), from the focal point F1 of the light L1 incident onto the effective region 111, or is moved off the optical axis OX (as shown in FIG. 6).

As described above, the second point F2 is kept away from the first point F1, so that the light L2 incident onto the non-effective region 112 does not act as a light for recording or reproducing the information. In other words, if the light L2 incident onto the non-effective region 112 is focused on the point F2, adjacent to the point F1, noise can be produced in the recorded or reproduced information by the light L2. However, with the diffraction element 140, the light L2 incident onto the non-effective region 112 is focused on the point F2, which is spaced away from the point F1, thereby preventing the noise from being produced. In this way, degradation due to aberration caused by the portion of the light which is incident onto the non-effective region 112 of the light source side lens surface 110 can be prevented.

Referring again to FIG. 5, the focal point F2 of the light L2 incident onto the non-effective region 112 is kept toward the disc D further away from the focal point F1 of the light L1 incident onto the effective region 111 along the optical axis OX, and the distance between F1 and F2 is designated as dx1. Here, the diffraction element 140 (see FIG. 4) of the objective lens 100 may be designed, so that the distance dx1 by which the focal points is separated is within a range represented by a formula 1 as described below. In the formula 1, Dmax is a distance from a surface of the disc D to a deepest recording layer of the disc D, and Dmin is a distance from the surface of the disc D to a most shallow recording layer of the disc D. If the disc D has only one recording layer, Dmax equals Dmin.

$$2 \times D\max - D\min + 10 \ \mu m \leq d_{x1} \leq 600 \ \mu m \qquad (1)$$

In FIG. 5, the point F2 is spaced toward the disc D from the point F1 along the optical axis OX, but according to another exemplary aspect, the point F2 may be spaced toward the objective lens 100 from the point F1 along the optical axis OX. In this case, assuming that a distance between the point F1 and the point F2 is dx2, the diffraction element 140 of the objective lens 100 may be designed, so that the distance dx2 is within a range represented by the following formula 2:

$$D\max + 10 \ \mu m \leq dx2 \leq 400 \ \mu m \qquad (2)$$

Referring again to FIG. 6, the focal point F2 of the light L2 incident onto the non-effective region 112 is spaced, by a distance dy, in a direction perpendicular to the optical axis OX away from the optical axis OX. In this case, the diffraction element 140 (see FIG. 4) of the objective lens 100 may be designed, so that the distance dy, between the optical axis OX and the focal point F2, is within a range represented by a formula 3 as described below. Here, f1 represents a focal distance of the objective lens 100 and f2 represent a focal distance of a combination lens in which the collimating lens 30 and the sensor lens 50 are combined with each other.

$$0.45 \times (f2/f1) \leq dy \leq f2/f1 \qquad (3)$$

As described above, in case of the objective lens 100 according to the first exemplary embodiment, the diffraction element 140 is formed in the non-effective region 112 of the light source side lens surface 110. In other exemplary embodiments, it will be sufficiently appreciated to those of skill in the art that such a diffraction element 140 may be formed in a non-effective region of the disc side lens surface 120.

Figure 7:
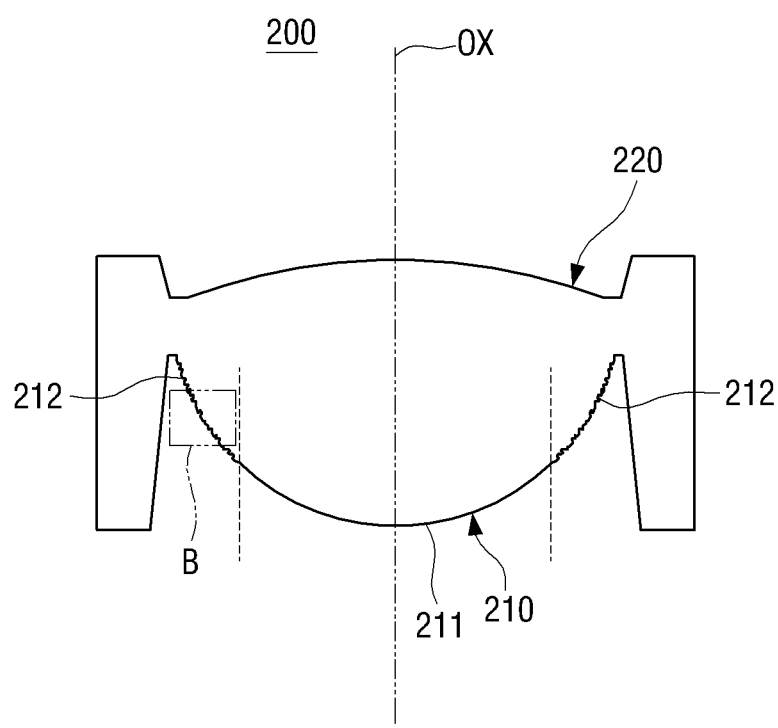
FIG. 7 is a side elevation of an objective lens for optical pickup according to a second exemplary embodiment.
Figure 8:
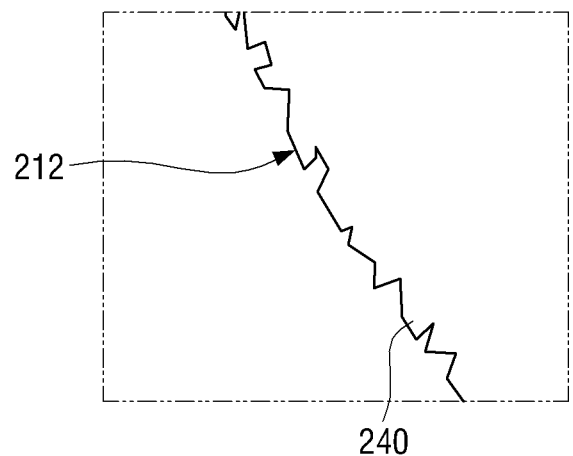
FIG. 8 is a view magnifying an region B of FIG. 7.
Figure 9:
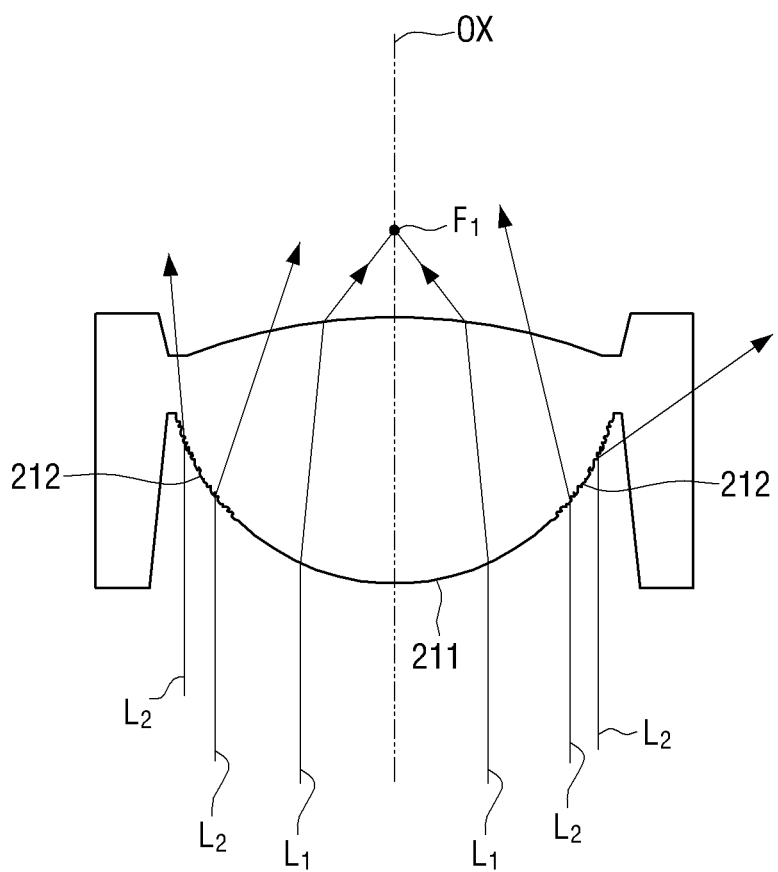
FIG. 9 is a view showing a path of light incident into the objective lens for optical pickup shown in FIG. 7.

FIG. 7 is a side elevation of an objective lens 200 for optical pickup according to a second exemplary embodiment, FIG. 8 is a view magnifying a region B of FIG. 7, and FIG. 9 is a view showing a path of light incident into the objective lens 200 for optical pickup shown in FIG. 7.

Referring to FIGS. 7 and 8, the objective lens 200 has a light source side lens surface 210 and a disc side lens surface 220. The light source side lens surface 210 includes an effective region 211 disposed at a central region of the objective lens 200 and a non-effective region 212 disposed toward a peripheral region of the objective lens 200, and the non-effective region 212 is provided with a scattering element 240 as a light path changing element. A shape of the scattering element 240 shown in FIG. 8 is merely exemplary, and in other exemplary embodiments, scattering elements with other shapes may be employed.

Referring to FIG. 9, light L1 incident onto the effective region 211 is focused on a point F1, whereas a light L2 incident onto the non-effective region 212 is scattered by the scattering element 240 formed in the non-effective region 212 and thus is not focused.

For this reason, even if a portion of the light irradiated from the light source 10 is incident on the non-effective region 212, it is scattered by the scattering element 240 and the scattered light does not cause noise in process of recording and reproducing the information. Accordingly, the degradation or deterioration caused by aberration of the light incident onto the non-effective region 212 can be considerably restrained.

In case of the objective lens 200 according to the second exemplary embodiment, the scattering element 240 is formed in the non-effective region 212 of the light source side lens surface 210. In other exemplary embodiments, it will be sufficiently appreciated by those of skill in the art that such a scattering element 240 may be formed in a non-effective region of the disc side lens surface 220 (see FIG. 7).

Figure 10:
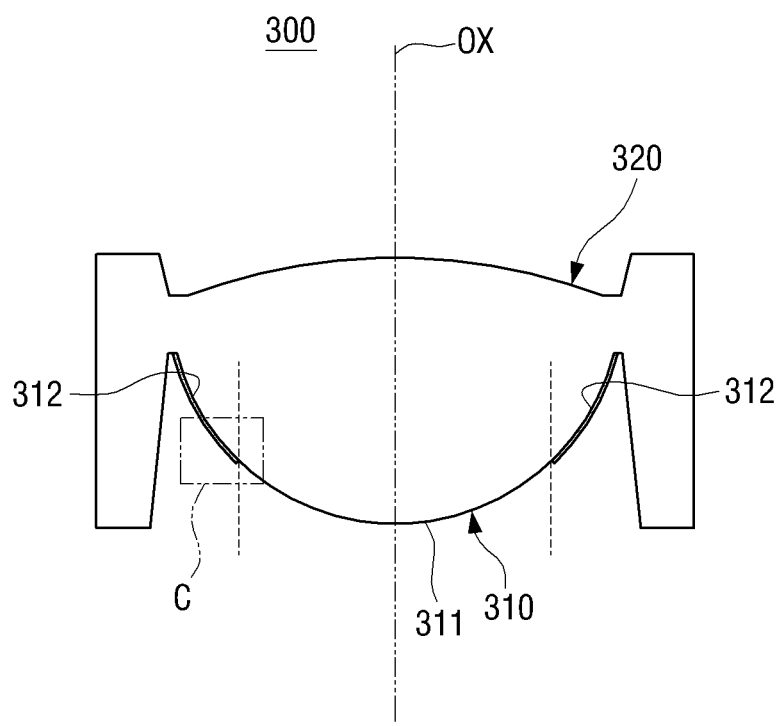
FIG. 10 is a side elevation of an objective lens for optical pickup according to a third exemplary embodiment.
Figure 11:
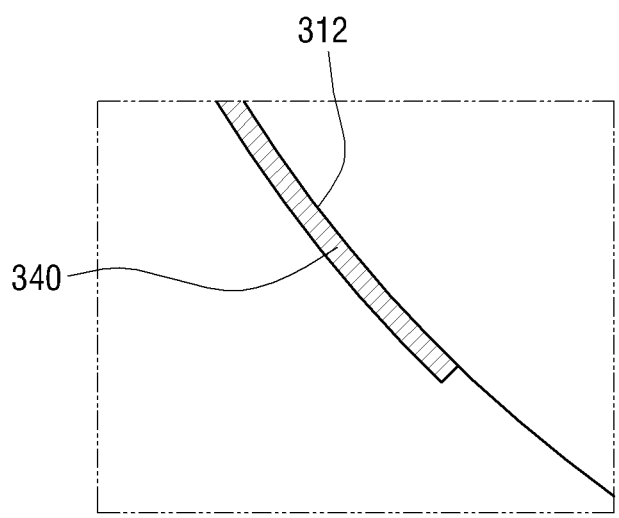
FIG. 11 is a view magnifying an region C of FIG. 10.
Figure 12:
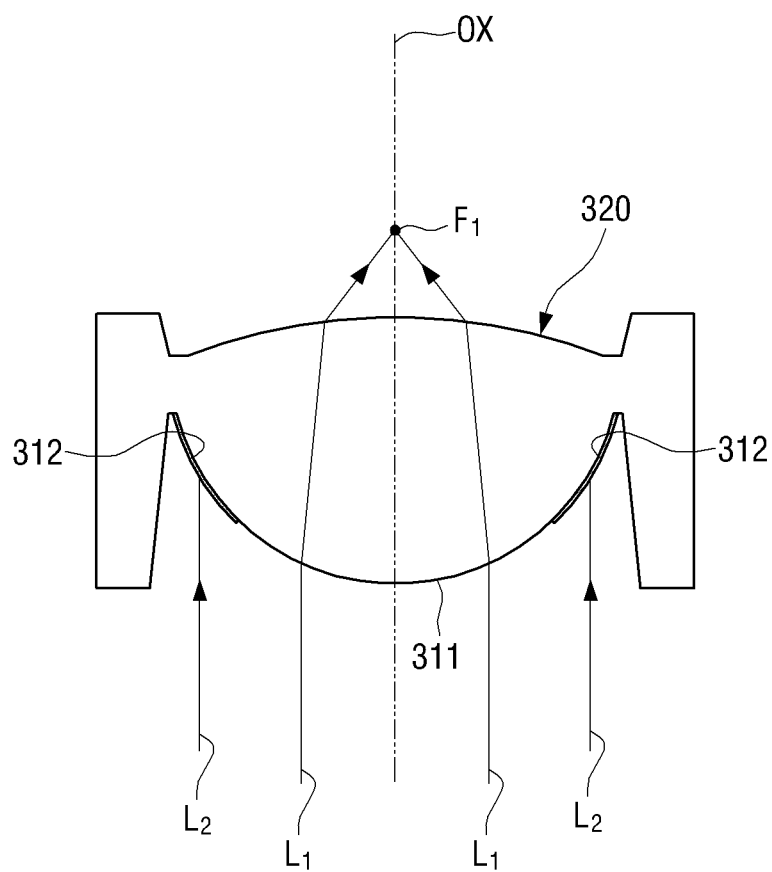
FIG. 12 is a view showing a path of light incident into the objective lens for optical pickup shown in FIG. 10.

FIG. 10 is a side elevation of an objective lens 300 for optical pickup according to a third exemplary embodiment, FIG. 11 is a view magnifying a region C of FIG. 10, and FIG. 12 is a view showing a path of light incident onto the objective lens 300 for optical pickup shown in FIG. 10.

Referring to FIGS. 10 and 11, the objective lens 300 has a light source side lens surface 310 and a disc side lens surface 320. The light source side lens surface 310 includes an effective region 311 disposed at a central region of the objective lens 300 and a non-effective region 312 disposed toward a peripheral region of the objective lens 300, and the non-effective region 312 is provided with a penetration blocking member 340 as a light path changing element. Here, the penetration blocking member 340 is made of a material which total-reflects or absorbs the light incident thereon, and is coated on or attached to the non-effective region 312. In the third exemplary embodiment, the penetration blocking member 340 is made of light absorbing material.

Referring to FIG. 12, light L1 incident onto the effective region 311 is focused on a point F1, whereas light L2, incident onto the non-effective region 312, is absorbed by the penetration blocking member 340 and thus is not transmitted into the objective lens 320. For this reason, the light L2 incident onto the non-effective region 312 does not act as noise in process of recording and reproducing information. Accordingly, the degradation or deterioration caused by aberration of the light incident onto the non-effective region 312 can be prevented.

In case of the objective lens 300 according to the third exemplary embodiment, the penetration blocking member 340 is formed in the non-effective region 312 of the light source side lens surface 310. In other exemplary embodiments, it will be appreciated by those of skill in the art that such a penetration blocking member 340 may be formed in a non-effective region of the disc side lens surface 320.

Although exemplary embodiments have been explained and drawings are provided as described above, these exemplary embodiments and drawings are not limiting and the description provided herein can be readily applied to other types of apparatuses and many alternatives, modifications, and variations will be apparent to those skilled in the art.

Thus, the scope of the present inventive concept is not to be construed as being limited to the description of the exemplary embodiments, and is to be construed by the attached claims and their equivalents.

What is claimed is:

1. An objective lens for optical pickup, comprising:
a light source side lens surface and a disc side lens surface, wherein the light source side lens surface and the disc side lens surface each comprise an effective region, which is disposed at a central region of the objective lens, and a non-effective region which is disposed outside the effective region, and
an optical path changing element, disposed in the non-effective region of at least one of the light source side lens surface and the disc side lens surface, which changes a path of light incident thereon;
wherein a distance between a focal point of light incident on the non-effective region and the focal point of light incident on the effective region is $dx1$, a distance from a surface of the disc to a deepest recording layer of the disc is $Dmax$, a distance from the surface of the disc to a most shallow recording layer of the disc is $Dmin$, and the distance $dx1$ is within a range represented by the following formula:

$$2 \times Dmax - Dmin + 10 \text{ μm} \leq dx1 \leq 600 \text{ μm}.$$

2. The objective lens of claim 1, wherein the optical path changing element comprises a diffraction element which changes a focal point of light incident on the non-effective region.

3. The objective lens of claim 2, wherein the diffraction element diffracts light incident thereon to a focal point further away from the objective lens than a focal point of light incident on the effective region.

4. The objective lens of claim 2, wherein the diffraction element diffracts light incident thereon to a focal point closer to the objective lens than a focal point of light incident on the effective region.

5. The objective lens of claim 2, wherein the diffraction element diffracts light incident thereon to a focal point off an optical axis of the objective lens.

6. The objective lens of claim 1, wherein the optical path changing element comprises a scattering element which scatters light incident thereon.

7. The objective lens of claim 1, wherein the optical path changing element comprises a penetration blocking member which blocks light incident thereon.

8. The objective lens of claim 1, wherein the penetration blocking member is one of a total reflection material and a light absorbing material.

9. The objective lens of claim 1, wherein the optical path changing element is disposed on the light source side lens surface.

10. The objective lens of claim 1, wherein the objective lens is configured for use with a blue-ray disc.

11. The objective lens of claim 1, wherein the objective lens is a compatible objective lens configured for use with a blue-ray disc, a digital versatile disc, and a compact disc.

12. An optical pickup apparatus, comprising:
a light source which generates light for recording information on a disc or reproducing information from the disc;
an objective lens which focuses light from the light source onto the disc, the objective lens comprising a light source side lens surface and a disc side lens surface,
wherein the light source side lens surface and the disc side lens surface each comprise an effective region, disposed at a central region of the objective lens, and a non-effective region, disposed outside the effective region; and an optical path changing element, disposed in the non-effective region of at least one of the light source side lens surface and the disc side lens surface, which changes a path of light incident thereon;

wherein a distance between a focal point of light incident on the non-effective region and the focal point of light incident on the effective region is dx1, a distance from a surface of the disc to a deepest recording layer of the disc is Dmax, a distance from the surface of the disc to a most shallow recording layer of the disc is Dmin, and the distance dx1 is within a range represented by the following formula:

$$2 \times D\text{max} - D\text{min} + 10 \ \mu m \leq dx1 \leq 600 \ \mu m.$$

13. The apparatus of claim 12, wherein the optical path changing element comprises a diffraction element which changes a focal point of light incident on the non-effective region.

14. The apparatus of claim 13, wherein the diffraction element diffracts light incident thereon to a focal point further away from the objective lens than a focal point of light incident on the effective region.

15. The apparatus of claim 13, wherein the diffraction element diffracts light incident thereon to a focal point closer to the lens than a focal point of light incident on the effective region.

16. The apparatus of claim 15, wherein a distance between the focusing point of the light incident onto the non-effective region and the focusing point of the light incident onto the effective region is dx2, a distance from a surface of the disc to a deepest recording layer of the disc is Dmax, and the distance dx2 is within a range represented by the following formula:

$$D\text{max} + 10 \ \mu m \leq dx2 \leq 400 \ \mu m.$$

17. The apparatus of claim 13, wherein the diffraction element diffracts light incident thereon to a focal point off an optical axis of the objective lens.

18. The apparatus of claim 17, further comprising:
a collimating lens, disposed between the light source and the objective lens, which collimates light incident thereon from the light source;
a light detector which detects light reflected from the disc; and
a sensor lens, disposed on a light-incident side of the light detector, which focuses the light reflected from the disc onto the light detector,
wherein a distance between a focal point of the light incident on the non-effective region and the optical axis of the objective lens is dy, a focal distance of the effective region of the objective lens is f1, a focal distance of a combination lens comprising the collimating lens and the sensor lens is f2, and the distance dy is within a range represented by the following formula:

$$0.45 \times (f2/f1) \leq dy \leq f2/f1.$$

19. The apparatus of claim 12, wherein the optical path changing element comprises scattering element which scatters light incident thereon.

20. The apparatus of claim 12, wherein the optical path changing element comprises a penetration blocking member which blocks light incident thereon.

* * * * *